United States Patent [19]

Hattori et al.

[11] Patent Number: 4,871,198
[45] Date of Patent: Oct. 3, 1989

[54] CORRUGATED PLASTIC PIPE COUPLING

[75] Inventors: Kenichi Hattori, Kanagawa; Kazuya Imamatsu, Hiratsuka, both of Japan

[73] Assignee: The Furukawa Electric Co., Ltd., Tokyo, Japan

[21] Appl. No.: 158,343

[22] Filed: Feb. 22, 1988

[30] Foreign Application Priority Data

Mar. 4, 1987 [JP] Japan .................. 62-30359[U]

[51] Int. Cl.$^4$ ............................................. F16L 21/06
[52] U.S. Cl. ................................... 285/373; 285/903
[58] Field of Search .................... 285/903, 373, 236

[56] References Cited

U.S. PATENT DOCUMENTS

| | | | |
|---|---|---|---|
| 2,261,948 | 11/1941 | Beach | 285/236 X |
| 3,565,464 | 2/1971 | Wolf | 285/903 X |
| 4,084,844 | 4/1978 | Abner | 285/903 X |
| 4,172,607 | 10/1979 | Norton | 285/373 X |
| 4,174,985 | 11/1979 | Buidry | 285/903 X |
| 4,380,348 | 4/1983 | Swartz | 285/373 |
| 4,491,350 | 1/1985 | Wolf et al. | 285/236 |

FOREIGN PATENT DOCUMENTS 2321315 3/1975 Fed. Rep. of Germany ...... 285/236

Primary Examiner—Thomas F. Callaghan
Attorney, Agent, or Firm—Frishauf, Holtz, Goodman & Woodward

[57] ABSTRACT

A clamp-type corrugated plastic pipe coupling of the invention, which is clamped with a split mold having flanges, includes an outer coupling member having a corrugation at least on its inner surface and a packing member arranged inside the outer coupling member. The packing member has an inner surface with a corrugation substantially identical to the corrugations on outer surfaces of corruated plastic pipes to be connected. The packing member is made of a material having a rubber hardness of not more than 25 and a compression set of not more than 60%. The corrugated plastic pipe coupling having the above structure has watertightness which can sufficiently withstand a water pressure of 5 kg/cm$^2$ or more even when it is subjected to heat cycles between $-25°$ and $80°$ C.

11 Claims, 1 Drawing Sheet

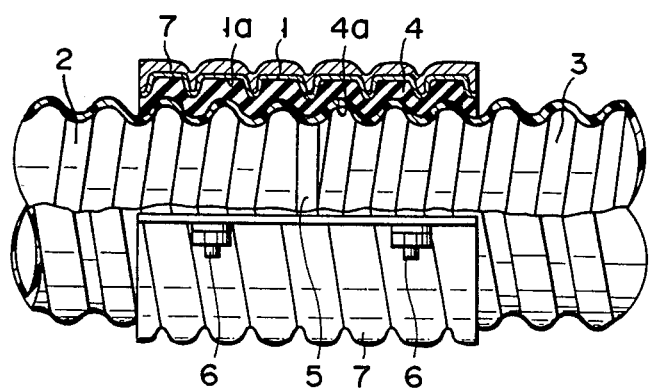
F I G. 2

CORRUGATED PLASTIC PIPE COUPLING

BACKGROUND OF THE INVENTION

1. Field of the Invention

The present invention relates to a corrugated plastic pipe coupling which is used for connection of corrugated plastic pipes having a corrugation such as a helical corrugation, a circular independent corrugation, and a rectangular corrugation and used as pipes for underground electric cables or sewer pipes, and which can easily constitute a connection having an excellent watertightness.

Conventionally, pipes for underground electric cables or sewer pipes are mainly constructed by burying Hume pipes. However, it is difficult to perform piping with various types of conventional pipes since they do not have flexibility, they are short and thus require many connection points, and they are heavy. In order to eliminate these drawbacks, various types of plastic pipes including corrugated pipes having a helical or independent corrugation, sine-wave or rectangular-wave form in the longitudinal section (hereinafter called "corrugated pipes"), are increasingly used year by year since they have flexibility and are lightweight and long.

According to the major demands for a plastic corrugated pipe used as a pipe for underground electric cables or a sewer pipe, such a pipe must have a deformation ratio of the outer diameter of 3.5% or less and a bending characteristic of 100 kg/m$^2$ or less when compression load P of 0.87R kg/cm (where R=(outer diameter+inner diameter)/4) is applied. The connecting portion must have excellent watertightness for the following reasons. When the pipe is used especially as a pipe for underground cables, the cables generate heat to increase the ambient temperature, and thus the pipe temperature reaches as high as 80° C. in an extreme case. In wintertime, the outer temperature is sometimes as low as −20° C. In this case, the pipe connecting portion receives an external water pressure by the underground water in a heat cycle between −20° C. and 80° C.

A pressure-type drain pipe receives an internal pressure of maximum 5 kg/cm$^2$ for a long period of time. Therefore, the pipe connecting portion of the pressure-type drain pipe must have excellent watertightness.

FIG. 1 shows the connecting structure of a conventional corrugated plastic pipe having a helical corrugation as a pipe for electric cables. More specifically, in this corrugated pipe, corrugated sleeve coupling 11 having a substantially constant helical corrugation is screwed to bridge opposite ends of corrugated pipes 12 and 13 to be coupled. Tapes 15 are respectively wound on the two ends of sleeve coupling 11 with pressure. In other words, as shown in FIG. 1, sealing tapes 14 are respectively wound on the two ends of screwed sleeve coupling 11 with pressure, and rubber tapes 15 are widely wound with pressure to sufficiently cover tape 14. Each PVC tape 16 is helically wound on one end of each tape 15 with pressure to cover it.

Since corrugated plastic pipes 12 and 13 are flexible, they can be laid and installed in a wound state, and they can have a long length. However, since they are handled in a wound state, their end portions tend to be curled. Therefore, sleeve coupling 11 having a helical corrugation generally has a larger inner diameter than the outer diameter of pipes 12 and 13. Otherwise, coupling 11 cannot be threadably engaged with pipes 12 and 13. As a result, conventionally, the following problems occur and the resultant connecting portion cannot have excellent watertightness.

More specifically, with the connecting structure described above, it is difficult to tightly wind a tape on the corrugation of the pipe, and it is difficult to impart good watertightness to the connecting portion of the two pipes. Since the tapes are exposed to the outside of the pipe, they can be damaged during pipe installation, and the performance of the tapes can be degraded. If a pipe is used for electric cables, when a power is supplied to the electric cables in the pipe, heat (maximum of 80° C.) is generated and sealing tape 14 is fluidized. Fluidized tape 14 may flow into the pipe to further degrade the watertightness.

According to another method, split mold-type clamping couplings are mounted on a pipe through a seal member having tackiness, thus constituting a pipe connecting portion. In this case, however, the seal member of such a pipe connecting portion may cause cold flow, thereby degrading watertightness.

SUMMARY OF THE INVENTION

It is an object of the present invention to provide a corrugated plastic pipe coupling capable of easily constituting a connection of corrugated plastic pipes, which can withstand a high water pressure of 5 kg/cm$^2$ or more even if it is subjected to a heat cycle (repeated thermal changes) within a wide temperature range of −25° and 80° C., and which has improved watertightness.

More specifically, according to the present invention, there is provided a clamp-type corrugated plastic pipe coupling which is clamped with a split mold having flanges, comprising:

an outer coupling member having a corrugation at least on its inner surface; and a packing member arranged inside the outer coupling member, wherein the packing member has an inner surface with a corrugation substantially identical to the corrugations on outer surfaces of corrugated plastic pipes to be connected, and the packing member is made of a material having a rubber hardness of not more than 25 and a compression set of not more than 60%.

The material for the outer coupling member is preferably either a plastic (e.g., polyethylene, polypropylene, or polyvinyl chloride) or a metal (e.g., aluminum or iron).

The corrugation on the inner surface of the outer coupling member is preferably either a helical configuration, or a set of unconnected axially spaced or "independent" corrugations, depending on the corrugation of the corrugated pipes to be coupled.

The corrugation formed on the outer and inner surfaces of the packing member is preferably either a helical or independent corrugation.

The rubber hardness of 25 or less and the compression set of 60% or less of the packing member are measured in accordance with JIS K 6301-1975. Examples of the material for the packing member satisfying these conditions include a member selected from the group consisting of a vulcanized butyl rubber, an ethylene-propylene copolymer, a styrene butadiene-based elastomer, and natural rubber.

The packing member is made of a material having the above rubber hardness and compression set due to the following reasons.

More specifically, the coupling of the present invention does not aim at maintaining the watertightness by means of the tackiness of the sealing member as in the conventional cases. Rather, in the present invention, the watertightness is maintained by utilizing the resilience of the corrugated packing member. In this case, the corrugated packing member is too hard if its rubber hardness (Hs) exceeds 25, and is too soft if its compression set exceeds 60%. A connecting portion having high watertightness of 5 kg/cm$^2$ cannot be formed in either case. Therefore, those having such properties are excluded from the material for the packing member.

FIG. 2 shows a corrugated plastic pipe coupling according to an embodiment of the present invention.

Referring to FIG. 2, reference numeral 1 denotes an outer coupling member. Coupling member 1 is clamped from outside by a split mold 7 having flanges. Corrugation 1a is formed on the inner surface of coupling member 1. Corrugated plastic pipes 2 and 3 are inserted in coupling member 1 through packing member 4. Packing member 4 is made of a material having a rubber hardness of 25 or less and a compression set of 60% or less. Corrugation 4a substantially identical to those on the outer surfaces of pipes 2 and 3 is formed on the inner surface of packing member 4.

The split mold can have a shell structure other than a complete split structure.

The outer shape of packing member 4 conforms to corrugation 1a on the inner surface of outer coupling member 1.

The corrugated plastic pipe coupling having the above structure can have watertightness capable of withstanding a water pressure of 5 kg/cm$^2$ even when it is subjected to a heat cycle within the range of $-25°$ C. and $80°$ C.

BRIEF DESCRIPTION OF THE DRAWINGS

FIG. 2 is a view for explaining the structure of a corrugated plastic pipe coupling of the present invention.

DETAILED DESCRIPTION OF THE PREFERRED EMBODIMENT

EXAMPLE 1

Figure 1:
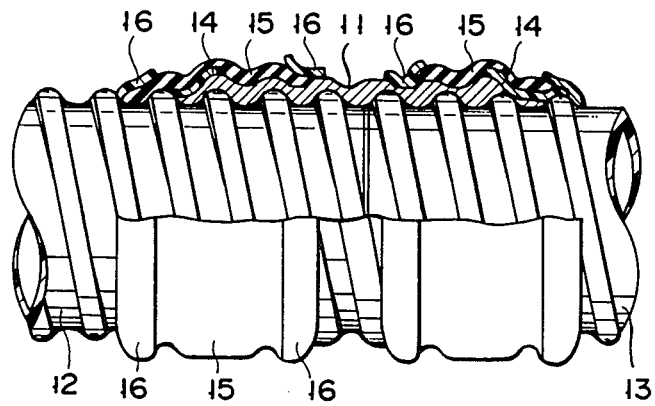
FIG. 1 is a partially sectional front view of an example of a conventional plastic pipe coupling having a helical corrugation.

As shown in FIG. 2, coupling 1 was mounted on connecting portion 5 of two polyethylene pipes having a helical corrugation with sine-wave form in the logitudinal section (nominal diameter: 80 mm) through packing member 4. Coupling 1 was clamped with complete half-type aluminum split mold 7. A helical corrugation with sine-wave form in the longitudinal section, was formed on the inner and outer surfaces of split mold 7. Packing member 4 is made of vulcanized butyl rubber having a rubber hardness (Hs) of 5 and a compression set of 55% according to JIS K 6301. Corrugated packing member 4 is formed to have, on its inner and outer surfaces, corrugations substantially identical to those on the outer surfaces of corrugated polyethylene pipes 2 and 3. After coupling 1 was mounted through packing member 4, aluminum split mold 7 consisting of two halves was mounted on coupling 1 and was clamped at its flanges with tie bolts 6. In this case, since packing member 4 made of vulcanized butadiene rubber was urged, it served well as the packing member because of its impact resilience. Obtained coupling 1 at connecting portion 6 of polyethylene pipes having a helical corrugation 2 and 3 was subjected to a test of 15 heat cycles between $-20°$ and $60°$ C. and then to an external water pressure test. It was found that obtained coupling 1 could withstand a water pressure of 5 kg/cm$^2$.

EXAMPLE 2

A coupling was mounted on a butt connecting portion of two polyethylene pipes (each having a independent corrugation with sine-wave form in the longitudinal section) (nominal diameter: 80 mm) through a packing member in the same manner as in Example 1. The coupling was clamped with a complete split-type aluminum mold. Independent corrugations with sine-wave form in the longitudinal section, were formed on the inner and outer surfaces of each mold.

The packing member was made of ethylene-propylene copolymer (EPDM) having a rubber hardness (Hs) of 15 and a compression set of 25% according to JIS K 6301. The corrugated packing member was formed to have, on its inner and outer surfaces, corrugations substantially identical to those on the outer surfaces of the corrugated polyethylene pipes. After the coupling was mounted through the packing member, aluminum split mold 7 consisting of two halves was mounted on the coupling and was clamped at its flanges with tie bolts. In this case, since the packing member made of EPDM described above was urged, it served well as the packing member because of its impact resilience. The obtained coupling at the connecting portion of the corrugated polyethylene pipes was subjected to a test of 15 heat cycles between $-20°$ and $60°$ C. and then to an external water pressure test. It was found that the obtained coupling could withstand a water pressure of 5 kg/cm$^2$.

EXAMPLE 3

A coupling was mounted on a butt connecting portion of two polyethylene pipes having a helical corrugation with sine-wave form in the longitudinal section (nominal diameter: 100 mm) through a packing member in the same manner as in Example 1. The coupling was clamped with a shell-type rigid polyethylene split mold. The outer surface of the split mold was flat and a helical corrugation was formed on its inner surface.

The packing member was made of a styrene butadiene-based elastomer having a rubber hardness (Hs) of 20 and a compression set of 40% according to JIS K 6301. The corrugated packing member is formed to have, on its inner surface, a corrugation substantially identical to those on the outer surfaces of the corrugated polyethylene pipes. After the coupling was mounted through the packing member, the shell-type rigid polyethylene split mold was mounted on the coupling and was clamped at its flanges with tie bolts. In this case, since the packing member made of styrene butadiene-based elastomer described above was urged, it served well as the packing member because of its impact resilience. The obtained coupling at the connecting portion of the corrugated polyethylene pipes was subjected to a test of 15 heat cycles between $-20°$ and $60°$ C. and then to an external water pressure test. It was found that the obtained coupling could withstand a water pressure of 5 kg/cm$^2$.

COMPARATIVE EXAMPLE 1

Coupling 1 was formed under the same conditions as in Example 1 but using packing member 4 made of vulcanizate having a rubber hardness Hs=30. Obtained coupling 1 was subjected to an external water pressure test with respect to connecting portion 6 of its polyethylene pipes having a helical corrugation with sine-wave form in the longitudinal section. Water leakage occurred in the pipes when the water pressure was 1.5 kg/cm$^2$.

From the results of Examples 1 to 3 and Comparative Example 1, it can be assumed that, when a rubber mold having a rubber hardness Hs exceeding 25 in accordance with JIS K 6301-1975 is used as a packing member and urged against corrugated plastic pipes 2 and 3, pipes 2 and 3 are deformed as well, rubber packing member 4 does not fit well on the pipes 2 and 3, and water leakage thus occurs.

COMPARATIVE EXAMPLE 2

Coupling 1 was formed under the same conditions as in Example 1 but interposing packing member 4, made of an unvulcanized butyl rubber having a compression set of 95% and a rubber hardness Hs of 10, between coupling 1 and polyethylene pipes.

Obtained coupling 1 was subjected to a test of 15 heat cycles between −20° and 60° C. and then to an external water pressure test with respect to the connecting portion of the resultant helically corrugated polyethylene pipes having a helical corrugation with sine-wave form in the longitudinal section. Water leakage occurred in the pipes when the water pressure was 1.5 kg/cm$^2$. This is because the packing member could not be elastically recovered because of the thermal expansion and contraction according to the temperatures and a gap was formed between the corrugated pipes and packing member, thus resulting in water leakage.

EXAMPLE 4

A connecting portion was formed by following the same sequence as in Example 1 except that polyethylene pipes (nominal diameter: 80 mm) having a helical corrugation with rectangular-wave form in the longitudinal section, were used as corrugated plastic pipes, that a split shell-type coupling having a smooth outer surface and an inner surface with a helical corrugation having rectangular-wave form in the longitudinal section, was used as a coupling, and that a corrugated packing member, made of an ethylene-propylene-diene copolymer having a compression set of 40 and a rubber hardness Hs of 15 and having inner and outer surfaces with a helical corrugation having a rectangular-wave form in the longitudinal section, was used as a packing member.

The obtained coupling was subjected to a test of 15 heat cycles between −20° and 60° C. and then to an external water pressure test with respect to its connecting portion. It was found that the obtained coupling could withstand a water pressure of 5 kg/cm$^2$.

What is claimed is:

1. A clamp-type corrugated plastic pipe coupling, comprising:
   split mold means adapted to surround outer surfaces of corrugated plastic pipes to be connected;
   an outer coupling member adapted to be received within said split mold means and having a corrugation at least on its inner surface; and
   a packing member arranged inside said outer coupling member, wherein the packing member is urged against the outer surfaces of the pipes to be connected when said outer coupling member is clamped from the outside by said split mold means,
   the corrugation on the inner surface of said outer coupling member corresponds in form to corrugations on the outer surfaces of the pipes to be connected,
   said packing member has an inner surface with a corrugation that conforms substantially identically to the corrugations on the outer surfaces of the corrugated plastic pipes to be connected, and
   said packing member is made of a material having a rubber hardness of not more than 25 and a compression set of not more than 60%.

2. A coupling according to claim 1, wherein the material of said outer coupling member is a selected one of a plastic and a metal.

3. A coupling according to claim 1, wherein the corrugation on the inner surface of said outer coupling member is a selected one of a helical corrugation and a set of unconnected spaced corrugations.

4. A coupling according to claim 1, wherein a corrugation is formed on the outer surface of said packing member.

5. A coupling according to claim 4, wherein the corrugation on the outer surface of said packing member is a selected one of a helical corrugation and a set of unconnected spaced corrugations.

6. A coupling according to claim 1, wherein the corrugation on the inner surface of said packing member is a selected one of a helical corrugation and a set of unconnected spaced corrugations.

7. A coupling according to claim 1, wherein the material of said packing member is a member selected from the group consisting of vulcanized butyl rubber, an ethylene-propylene copolymer, a styrene butadiene-based elastomer, and natural rubber.

8. A coupling according to claim 2, wherein the corrugation on the inner surface of said outer coupling member is a selected one of a helical corrugation and a set of unconnected spaced corrugations.

9. A coupling according to claim 4, wherein the material of said packing member is a member selected from the group consisting of vulcanized butyl rubber, an ethylene-propylene copolymer, a styrene butadiene-based elastomer, and natural rubber.

10. A coupling according to claim 5, wherein the material of said packing member is a member selected from the group consisting of vulcanized butyl rubber, an ethylene-propylene copolymer, a styrene butadiene-based elastomer, and natural rubber.

11. A coupling according to claim 6, wherein the material of said packing member is a member selected from the group consisting of vulcanized butyl rubber, an ethylene-propylene copolymer, a styrene butadiene-based elastomer, and natural rubber.

* * * * *

UNITED STATES PATENT AND TRADEMARK OFFICE
CERTIFICATE OF CORRECTION

PATENT NO. : 4,871,198

DATED : October 3, 1989

INVENTOR(S) : HATTORI et al

It is certified that error appears in the above-identified patent and that said Letters Patent is hereby corrected as shown below:

ON THE TITLE PAGE
In the Abstract, line 8, change:

"corruated" to --corrugated--.

Signed and Sealed this

Seventeenth Day of March, 1992

Attest:

HARRY F. MANBECK, JR.

*Attesting Officer* — *Commissioner of Patents and Trademarks*